United States Patent
Epping et al.

(10) Patent No.: US 7,251,341 B2
(45) Date of Patent: Jul. 31, 2007

(54) MICROPHONE

(75) Inventors: Heinz Epping, Hildesheim (DE);
Guenter Rosen, Wedemark (DE);
Konrad Huss, Wedemark (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 485 days.

(21) Appl. No.: 10/870,129

(22) Filed: Jun. 16, 2004

(65) Prior Publication Data

US 2004/0258268 A1   Dec. 23, 2004

(30) Foreign Application Priority Data

Jun. 20, 2003   (DE) ................. 103 27 634

(51) Int. Cl.
*H04R 25/00* (2006.01)
(52) U.S. Cl. ...................... 381/361; 381/355
(58) Field of Classification Search ........... 381/355, 381/361, 362, 366; 379/430, 433.01, 433.03
See application file for complete search history.

(56) References Cited

U.S. PATENT DOCUMENTS

| 4,845,760 A | 7/1989 | Awakowicz et al. |
| 5,031,872 A | 7/1991 | Vance et al. |
| 7,088,839 B2 * | 8/2006 | Geschiere et al. .......... 381/368 |

FOREIGN PATENT DOCUMENTS

| DE | 42 29 450 | 12/1993 |
| DE | 43 36 948 | 11/1994 |
| DE | 102 54 644 | 6/2003 |
| GB | 691562 | 5/1953 |
| GB | 2 255 687 | 11/1992 |
| JP | 5-64279 | 3/1993 |
| JP | 05064279 | 3/1993 |
| JP | 11-55795 | 2/1999 |
| JP | 2002-48771 | 2/2002 |
| JP | 2002-204491 | 7/2002 |
| WO | WO 94/23521 | 10/1994 |
| WO | WO 03/041447 | 5/2003 |

* cited by examiner

*Primary Examiner*—Tuan Duc Nguyen
(74) *Attorney, Agent, or Firm*—Reed Smith LLP

(57) ABSTRACT

The invention relates to a microphone. Microphones of very different types and genera have been known for a very long time and are also required for very different applications. Apart from "classical" microphones, microphones are also used in headsets, and frequently microphones are accommodated by mounts, e.g. goosenecks, vibrating mounts, microphone booms and the like. The object of the invention is therefore to avoid the previous disadvantages and to propose an aesthetically attractive solution with which the microphone transducer can be decoupled from the structure-borne sound excitation of the housing. A microphone having a housing and a microphone transducer accommodated by the housing, characterised in that a structure-borne sound decoupling element bearing the transducer is constructed inside the housing.

4 Claims, 3 Drawing Sheets

MICROPHONE

CROSS-REFERENCE TO RELATED APPLICATION

This application claims priority of German Patent Application No. 103 27 634.3, filed Jun. 20, 2003, the complete disclosure of which is hereby incorporated by reference.

BACKGROUND OF THE INVENTION a) Field of the Invention

The invention relates to a microphone.

b) Description of the Related Art

Microphones of very different types and general have been known for a long time and are also required for very different applications. Apart from the "classical" microphones, microphones are also used in headsets and frequently microphones are accommodated by mounts, e.g. goosenecks, vibrating mounts, microphone booms and the like.

A microphone always contains a microphone transducer, i.e. the element which converts the acoustic sound into an electrical or an optical signal. However, since the sound does not only strike the microphone transducer, but also the housing and the parts connected thereto, e.g. mountings, desks, etc., it is always necessary, even with high-quality microphone devices, for a structure-borne sound decoupling to be provided.

The following documents are cited as the prior art: DE 43 36 948 C1, DE 42 29 450 C1 and DE 102 54 644 A1.

For this purpose, very different mechanisms are already known, e.g. the decoupling by bellows, a vibrating mount and the like or by other elastic elements between the microphone transducer housing and the microphone mount.

In all known solutions for the structure-borne sound decoupling, the structure-borne sound decoupling element is visible because this element is always constructed between the microphone housing and the mount.

This previous solution is not always optically attractive (even if it was previously technically necessary) since the structure-born sound decoupling element absorbs the forces acting on the microphone system during use and the electroacoustic transducer. Likewise the previous solutions have the disadvantage that there is fundamentally the danger that the storage device, i.e. the structure-borne sound decoupling element, becomes damaged because it has a very exposed position inside the microphone system.

OBJECT OF SUMMARY OF THE INVENTION

Therefore the primary object of the invention is to avoid the previous disadvantages and to propose an aesthetically attractive solution with which the microphone transducer can be decoupled from the structure-borne sound excitation of the housing.

In accordance with the invention, a microphone comprises a housing, a microphone transducter accommodated by the housing and a structure-borne sound decoupling means bearing the transducer being constructed inside the housing. The structure-borne sound decoupling means further comprises at least one spring element and is connected to the microphone transducer by a rigid connection.

In the achievement according to the invention, the structure-borne sound decoupling element is laid inside the microphone housing—therefore it is not visible—and holds the structure-borne sound decoupling element or bears the microphone transducer (microphone capsule). The structure-borne sound decoupling element is preferably a spring element which is connected to the microphone transducer via a preferably rigid connection.

The invention is explained below by means of an exemplified embodiment.

DESCRIPTION OF THE PREFERRED EMBODIMENTS

Figure 1A:
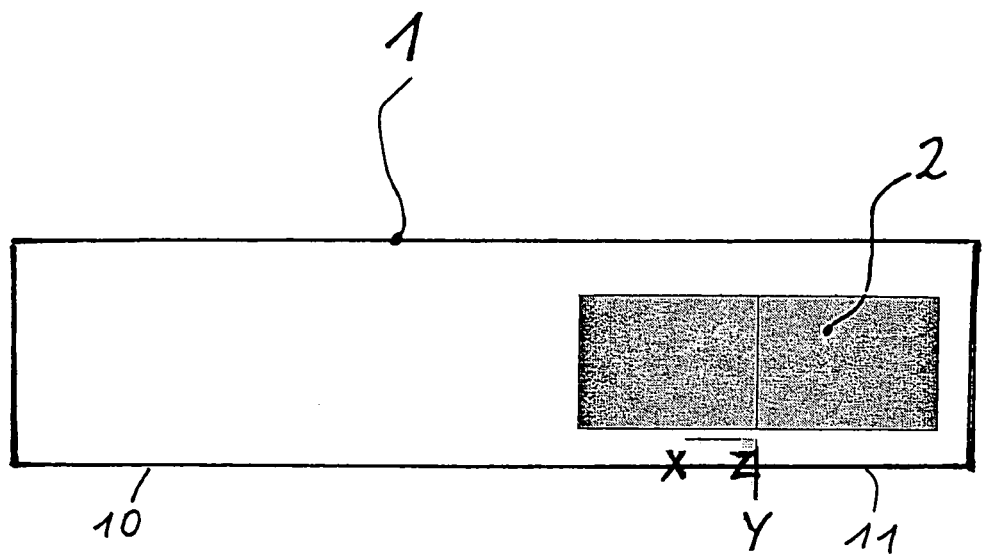
FIGS. 1a and 1b show a representation of a known microphone solution.
Figure 1B:
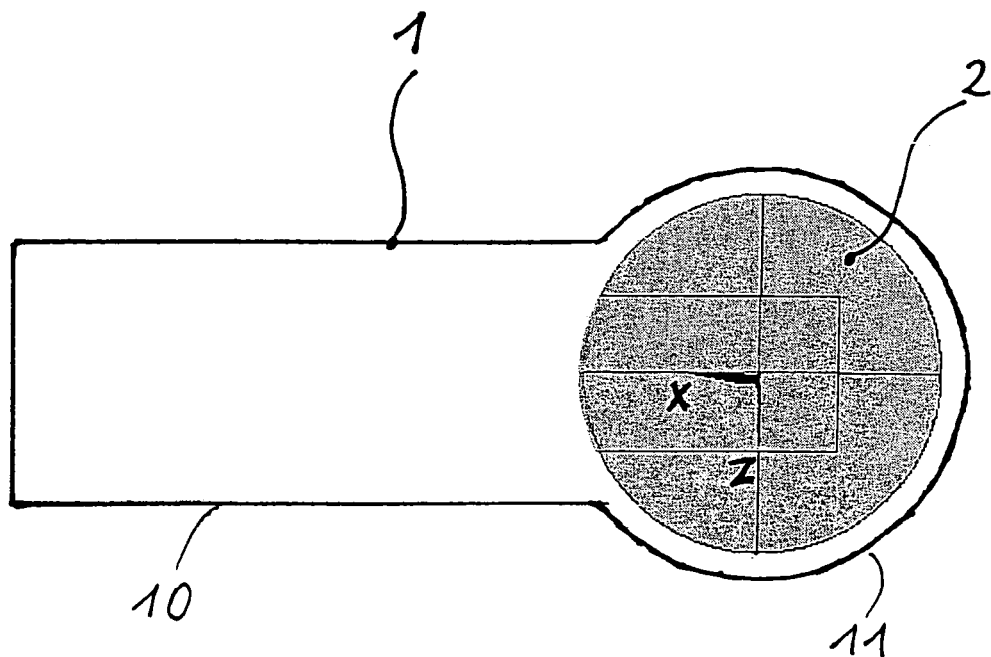

FIG. 1 shows the usual structure of a microphone capsule which is fixed to a gooseneck (not shown). The microphone housing 1 of the microphone capsule is securely connected or connected via a plug-in connection to the microphone mount, e.g. the gooseneck. The microphone 1 comprises a connection region 10 and a mouthpiece region 11. The microphone houses a transducer 2 in the mouthpiece region 11, with the transducer being constructed e.g. in accordance with the dynamic principle or as an electret capsule. Since the microphone housing should have the smallest possible dimensions for optical reasons, there is only a minimal space available between the housing 1—in the mouthpiece region 11—and the transducer 2, and in view of the extremely small space between the housing wall and the microphone capsule, sufficiently large elasticity cannot be achieved for storing a structure-borne sound decoupling element of the transducer.

Therefore for the structure-borne sound decoupling in the previous solutions, a spring element is always provided between the microphone mount and the microphone housing, e.g. as bellows or vibrating mount of type MZS 40, MZS 90, MZS 6 from Sennheiser.

Figure 2A:
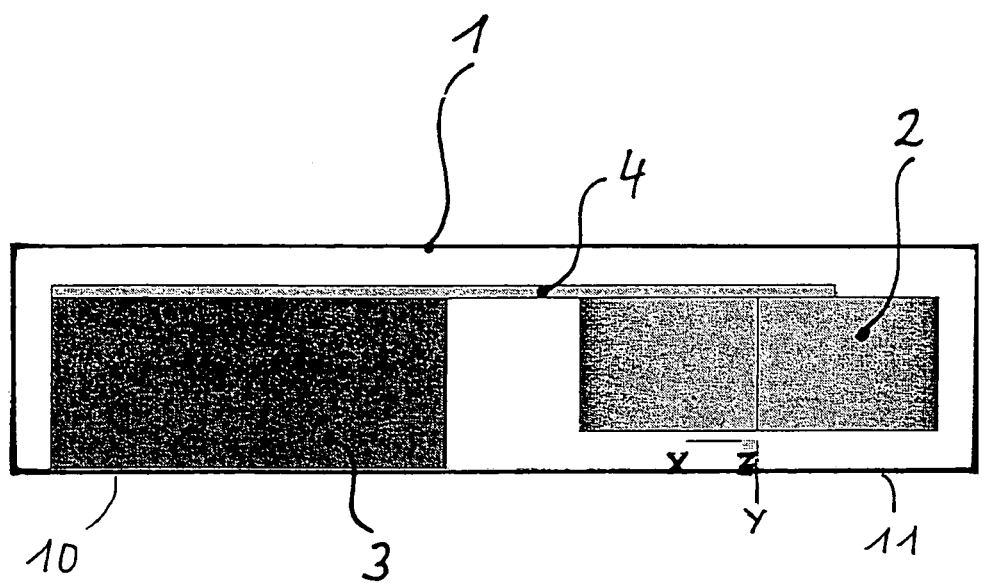
FIGS. 2a and 2b show a representation of a microphone according to the invention in accordance with a first exemplified embodiment.
Figure 2B:
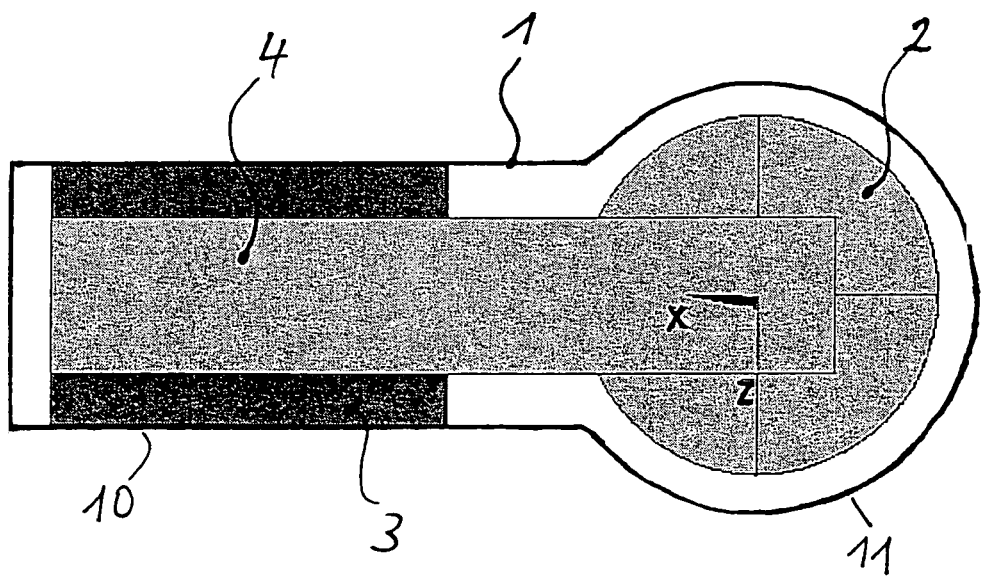

FIG. 2 shows a microphone according to the invention in accordance with a first exemplified embodiment, in which a structure-borne sound decoupling element lies inside the microphone housing, namely in the connecting region 10, which was previously always unused, because only the connecting cables to the transducer are located there. As can be seen in FIG. 2, the structure-borne sound decoupling element is constructed as a spring element, which is positioned inside the housing and is not visible from the outside. The spring element 3 in this case is connected via a preferably rigid connection 4 to the transducer 2 and holds (bears) it.

In this case the spring element 3 has a relatively weak construction in the Y direction in comparison with the X and Z directions (see FIG. 2a), but guarantees that the microphone transducer remains in its position of rest and this can also be held there.

The connecting element 4 has a substantially flat construction (FIG. 2b) and is mounted on the spring element at two sites at least.

The spring element 3 itself in turn has a substantially parallelepiped construction.

Consequently, the microphone comprises an alternative in which the element of the structure-borne sound decoupling is not visible from the outside and anyhow a sufficient structure-borne sound decoupling is provided, with the microphone housing not being larger than before either.

The spring element itself can be made from a plastic or rubber or another material which is elastic and during its action can apply a sufficient restoring force so that the microphone transducer remains in its provided position.

Figure 3:
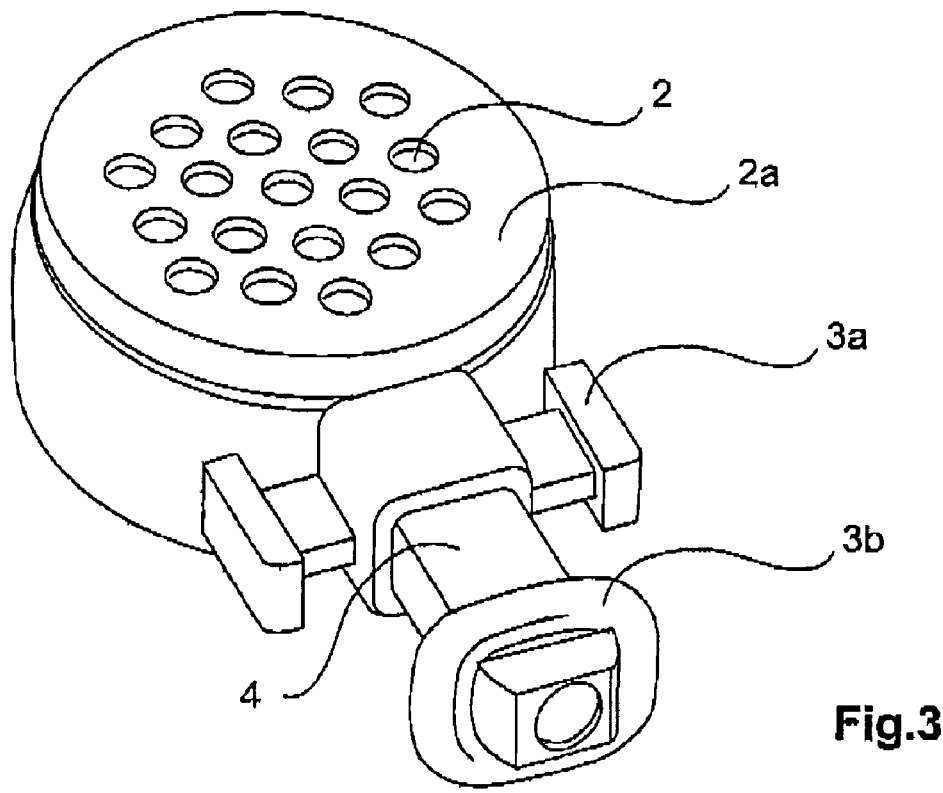
FIGS. 3 and 4 show a representation of a microphone according to a second exemplified embodiment.

FIG. 3 shows a microphone according to a second exemplified embodiment. The transducer 2 is surrounded by a housing 2a and is connected via a rigid connection 4 to spring elements 3a and 3b. The front spring element 3a guarantees in this case a gentle mounting of the transducer in an outer housing 5. The rear spring element 3b is constructed as a structural part similar to an O-ring and its purpose is to ensure the transducer 2 remains in its position of rest.

Figure 4:
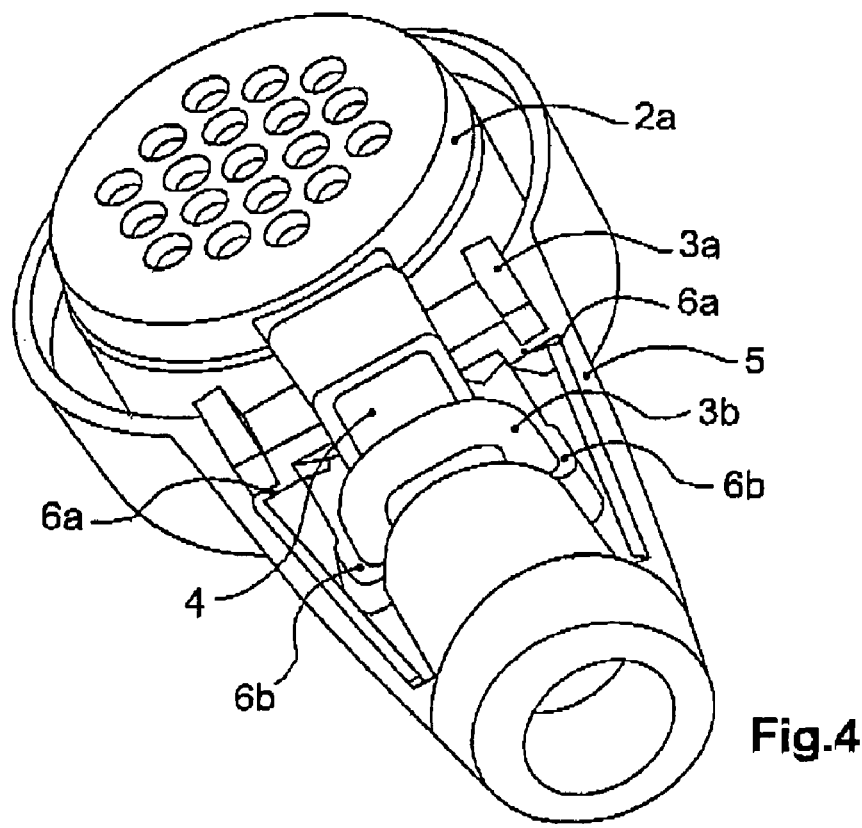

FIG. 4 shows a further representation of the microphone of FIG. 3, with just the lower half of the two-part outer formation 5 being portrayed, which comprises a connecting region 10 and a mouthpiece region 11. The transducer 2 and also the spring elements 3a and 3b are accommodated in an outer housing 5. The outer housing 5 in this case comprises first recesses 6a in its connecting region 10 for housing the front spring element 3a and also second recesses 6b for housing the rear spring element 3b.

Alternatively to this second exemplified embodiment, the rear spring element 3b may be constructed similarly or identically to the front spring element 3a. For this, the second recess 6a of course has to be adapted to the altered shape of the rear spring element 3b.

By the achievement according to the invention as specified by the first and second exemplified embodiments, the actual spring element is moved out of the mouthpiece region 11 into the otherwise unused connecting region 10. The capsule or the transducer 2 is connected to the spring element 3 via a rigid connection or a lever. In this case, the spring element may be disposed offset to the transducer 2, as a result of which the storage sites are disposed laterally and at the same height as the transducer.

While the foregoing description and drawings represent the present invention, it will be obvious to those skilled in the art that various changes may be made therein without departing from the true spirit and scope of the present invention.

What is claimed is:

1. A microphone comprising:
   a housing;
   a microphone transducer accommodated by the housing; and
   a structure-borne sound decoupling means bearing the transducer being constructed inside the housing;
   said structure-borne sound decoupling means further comprising at least one spring element and being connected to the microphone transducer by a rigid connection
   wherein said structure-borne sound decoupling means has a parallelepipedic construction,
   wherein the housing comprises a mouthpiece region and a connecting region, with the spring element being disposed in the connecting region.

2. The microphone according to claim 1, wherein said structure-borne sound decoupling means is surrounded by the housing so that it is not visible from the outside.

3. A microphone according to claim 1, wherein said structure-borne sound decoupling means comprises a first spring element and a second spring element.

4. A microphone according to claim 1, wherein said first spring element is suitable for provided a weak resilience of the transducer in the housing and/or the second spring element is suitable for holding the transducer in a rest position.

* * * * *

UNITED STATES PATENT AND TRADEMARK OFFICE
CERTIFICATE OF CORRECTION

PATENT NO. : 7,251,341 B2
APPLICATION NO. : 10/870129
DATED : July 31, 2007
INVENTOR(S) : Heinz Epping et al.

It is certified that error appears in the above-identified patent and that said Letters Patent is hereby corrected as shown below:

<u>TITLE PAGE</u>, ITEM (75) INVENTORS: SHOULD READ:

[75]  Inventors:      Heinz Epping,      Hildesheim (DE);

Guenter Rosen,   Wedemark (DE);

Konrad Hass,     Wedemark (DE)

Signed and Sealed this

Twenty-sixth Day of February, 2008

JON W. DUDAS
*Director of the United States Patent and Trademark Office*